(12) United States Patent
Van Wiemeersch

(10) Patent No.: US 9,467,817 B1
(45) Date of Patent: Oct. 11, 2016

(54) DETERMINING VEHICLE OCCUPANT LOCATION

(71) Applicant: Ford Global Technologies, LLC, Dearborn, MI (US)

(72) Inventor: John Robert Van Wiemeersch, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/713,045

(22) Filed: May 15, 2015

(51) Int. Cl.
*H04W 24/00* (2009.01)
*H04W 4/04* (2009.01)
*H04W 8/24* (2009.01)
*H04K 3/00* (2006.01)

(52) U.S. Cl.
CPC .............. *H04W 4/046* (2013.01); *H04K 3/415* (2013.01); *H04W 8/245* (2013.01)

(58) Field of Classification Search
CPC ..... H04W 64/00; H04W 4/02; H04W 8/245; H04K 3/415
USPC ................. 455/456.1, 456.5, 418; 340/425.5
See application file for complete search history.

(56) References Cited

U.S. PATENT DOCUMENTS

| | | | |
|---|---|---|---|
| 6,982,656 B1 | 1/2006 | Coppinger et al. | |
| 7,171,026 B2 | 1/2007 | Shinada | |
| 8,036,715 B2 | 10/2011 | Buck | |
| 8,738,292 B1 * | 5/2014 | Faaborg | G01C 21/26 701/117 |
| 8,862,486 B2 | 10/2014 | Cordova | |
| 6,526,646 B2 | 2/2015 | Bartz | |
| 9,037,125 B1 | 5/2015 | Kadous | |
| 9,037,199 B1 * | 5/2015 | Stogaitis | H04W 52/0254 455/456.1 |
| 2003/0098784 A1 | 5/2003 | Van Bosch et al. | |
| 2006/0253249 A1 | 11/2006 | Brulle-Drews | |
| 2009/0085728 A1 * | 4/2009 | Catten | H04K 3/415 340/425.5 |
| 2009/0327888 A1 | 12/2009 | Woolf et al. | |
| 2010/0201505 A1 | 8/2010 | Honary | |
| 2010/0280711 A1 | 11/2010 | Chen | |
| 2011/0074565 A1 | 3/2011 | Cuddihy et al. | |
| 2011/0084807 A1 | 4/2011 | Logan et al. | |
| 2012/0053793 A1 | 3/2012 | Sala | |
| 2013/0088352 A1 | 4/2013 | Amis | |
| 2013/0109342 A1 | 5/2013 | Welch | |
| 2013/0150004 A1 * | 6/2013 | Rosen | H04W 8/22 455/414.1 |
| 2013/0158771 A1 | 6/2013 | Kaufmann | |

(Continued)

FOREIGN PATENT DOCUMENTS

| | | |
|---|---|---|
| KR | 101319939 B1 | 10/2013 |
| KR | 101335344 B1 | 12/2013 |
| WO | WO 2013188977 A2 | 12/2013 |

OTHER PUBLICATIONS

US 8,868,286, 10/2014, Mullen (withdrawn).

(Continued)

*Primary Examiner* — Danh Le
(74) *Attorney, Agent, or Firm* — Frank A. MacKenzie; Bejin Bieneman PLC

(57) ABSTRACT

First and second movement data representing movement of first and second wearable portable devices during a first time period is provided. The first and second wearable portable devices are associated respectively with first and second users. The first and second sets of movement data are compared. Based at least in part on the comparison, a location in the vehicle of the first user relative to the second user is determined.

20 Claims, 5 Drawing Sheets

(56) References Cited

U.S. PATENT DOCUMENTS

| | | |
|---|---|---|
| 2014/0164559 A1 | 6/2014 | Demeniuk |
| 2014/0180731 A1 | 6/2014 | Cordova |
| 2014/0188348 A1 | 7/2014 | Gautama et al. |
| 2014/0297220 A1 | 10/2014 | Raffa et al. |
| 2014/0309934 A1 | 10/2014 | Ricci |
| 2014/0310788 A1 | 10/2014 | Ricci |
| 2014/0333425 A1 | 11/2014 | Giraud |
| 2014/0335902 A1 | 11/2014 | Guba |
| 2015/0019266 A1 | 1/2015 | Stempora |
| 2015/0025917 A1* | 1/2015 | Stempora ............... G06Q 40/08 705/4 |
| 2015/0070131 A1* | 3/2015 | Beaurepaire ........... G08G 1/005 340/5.8 |
| 2015/0130640 A1* | 5/2015 | Ryu ................... G06K 9/00812 340/932.2 |
| 2015/0256996 A1* | 9/2015 | Allen .................... G01S 19/13 455/418 |

OTHER PUBLICATIONS

P. Koteswara Rao, "Scening of an accidental alarm system of vehicles with a Heart beat sensor," International Journal of Emerging Trends & Technology in Computer Science, vol. 2, Issue 2, Mar.-Apr. 2013, pp. 191-194.

Non-Final Office Action dated Apr. 7, 2016; U.S. Appl. No. 14/713,019, filed May 15, 2015; 20 pages.

Non-Final Office Action dated Apr. 1, 2016; U.S. Appl. No. 14/712,994, filed May 15, 2015; 14 pages.

Goglia, et al. "Hand-transmitted vibration from the steering wheel to drivers of a small four-wheel drive tractor", Applied Ergonomics 34 (2003) 45-49; accepted Sep. 16, 2002 (5 pages).

Non-Final Office Action dated Jul. 11, 2016 in U.S. Appl. No. 14/713,025; filed May 15, 2015; (27 pages).

* cited by examiner

DETERMINING VEHICLE OCCUPANT LOCATION

CROSS-REFERENCE TO RELATED APPLICATIONS

This application is related to U.S. patent application Ser. No. 14/718,994, filed May 15, 2015 entitled "DETERMINING VEHICLE OCCUPANT LOCATION", U.S. patent application Ser. No. 14/713,008, filed May 15, 2015 entitled "WEARABLE DATA MANAGEMENT DURING INCIDENT", U.S. patent application Ser. No. 14/713,019, filed May 15, 2015 entitled "DETERMINING VEHICLE OCCUPANT LOCATION" and U.S. patent application Ser. No. 14/713,025, filed May 15, 2015 entitled "HAND-ON STEERING WHEEL DETECTION", the complete contents of which are hereby incorporated herein by reference in their entirety.

BACKGROUND

Present systems and methods for determining where a user is located within a vehicle suffer from various deficiencies. For example, visual systems such as facial recognition systems are expensive and typically require dedicated cameras. Systems determining user location based on the location of mobile phones are imprecise and unreliable because a user location and a device location can be different, e.g., the user may place the user's mobile phone on another seat. Further, after determining a location of a user, the user may move.

DESCRIPTION

Introduction

Figure 1:
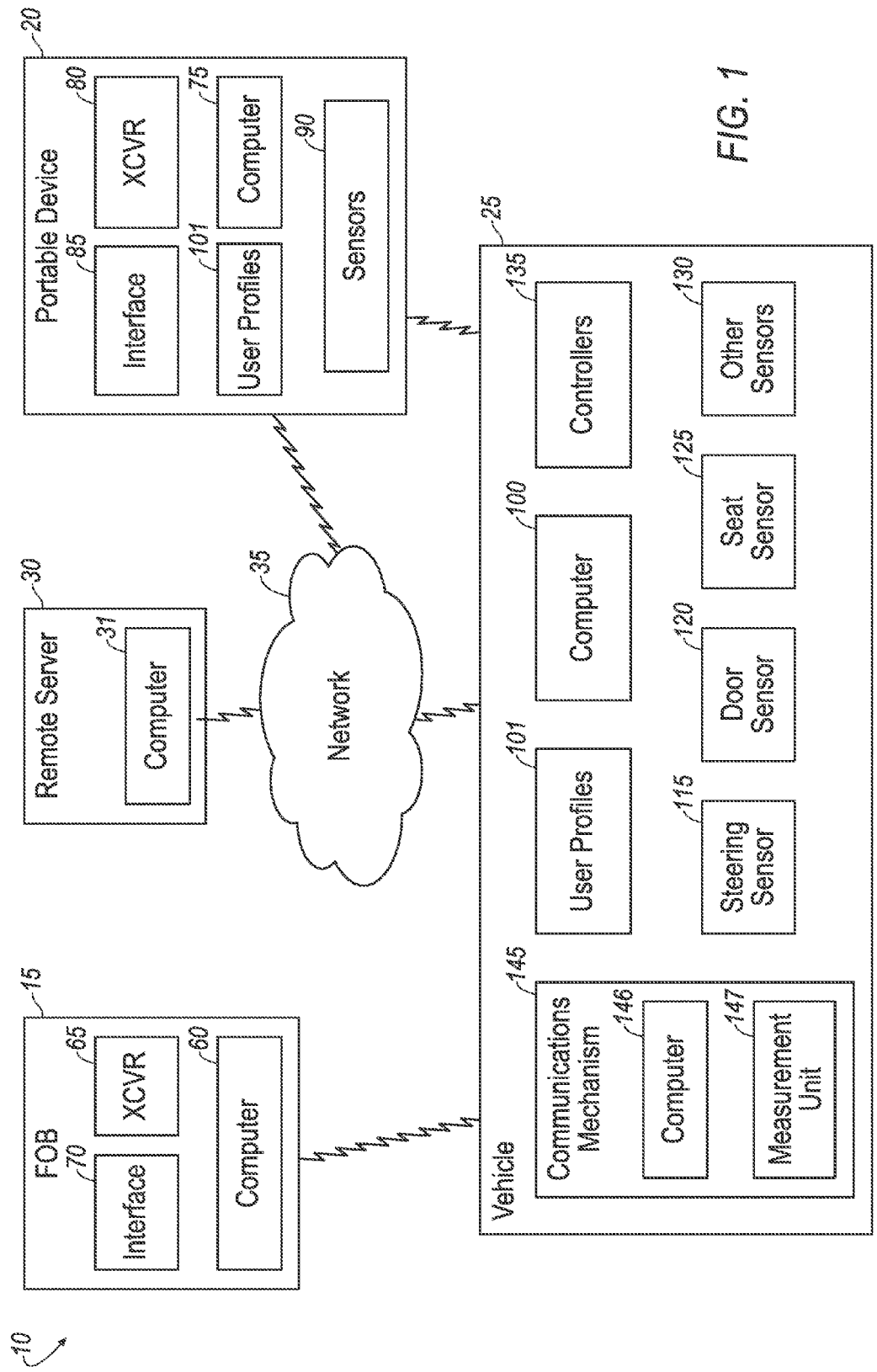
FIG. 1 is block diagram of an exemplary system for determining location(s) of one or more occupants of a vehicle using a wearable portable device.

Referring to FIG. 1, movement data from two or more portable devices 20 associated respectively with two or more users during a vehicle 25 turning event may be used by a computer 100 to determine relative locations of the users in the vehicle 25. The two or more portable devices 20 may be, e.g., wearable portable devices 20, worn by the respective users. The vehicle 25 computer 100 generally receives vehicle data from the vehicle sensors and controllers 115, 120, 125, 130, 135, and is programmed to determine from the vehicle data if a turning event is in progress. Based on a determination that a turning event is in progress, the computer 100 may send a request to each of the two or more portable devices 20 for movement data. The computer 100 receives the movement data respectively from the two or more portable devices 20.

After receiving the movement data, the computer 100 compares respective accelerations experienced by each of the portable devices 20. The computer 100 may then determine, e.g., that a first portable device 20 experienced a higher acceleration that a second portable device 20. The computer 100 may further determine that a first user associated with the first portable device is located radially outward in the vehicle relative to the second user associated with the second portable device. That is, in the case that the vehicle 25 is turning to the left, that the first user is located on a right side of the second user, measured radially from a center of the turning radius.

The relative location data may be combined with other location data regarding the users to further determine the location of each of the users within the vehicle 25. For example, following the example above, it may further be stored in a memory of the computer 100, e.g., as described in detail below, that the first and second user are each located in a front row of seats. Based on identifying the row of seats occupied by the first and second users, and the relative radial location of the first and second users, the computer 100 may determine, in the case of a left turn, that the first user is located in the vehicle 25 front passenger seat and the second user is located in the vehicle 25 driver seat.

Determining a particular location of, e.g., a specific seat occupied by a user in a vehicle 25, can allow a vehicle 25 computer 100 to personalize the user experience, by, for example, adjusting climate control, adjusting seat position, adjusting mirror positions, etc. In addition, safety systems such as seatbelt systems and airbag systems may be adjusted according to the respective locations of one or more users within the vehicle 25.

System Elements

As shown in FIG. 1, a system 10 includes a remote keyless entry device which may be a traditional fob or, e.g., a phone based remote entry telematics application (hereinafter fob) 15, one or more portable devices 20, a vehicle 25, a server 30 and a network 35. As described below, the fob 15 and portable device 20 may be communicatively coupled with the vehicle 25. Further as described below, the portable device 20 may be, e.g., a wearable device with or without cellular capability, a mobile telephone, a tablet, etc., and may be directly communicatively coupled with the vehicle 25, or indirectly coupled with the vehicle 25, e.g., through another portable device 20. The vehicle 25 may further be communicatively coupled with the server 30 via the network 35.

The fob 15 is configured, i.e., includes known mechanisms such as programming in a computer 60 and hardware such as a transceiver 65 for wireless communications, to send messages to the vehicle 25, e.g., commands or instructions controlling operations of the vehicle 25. For example, the fob 15 may send commands to the vehicle 25 instructing the vehicle 25 to lock or unlock doors, open a trunk lid or other hatch, start the ignition, etc. The fob 15 further generally includes a user interface 70. The fob 15 may be an app on the portable device 20 which sends these same commands to the remote sever 30 or network 35 which may then send commands to the vehicle 25 instructing the vehicle 25 to lock or unlock doors, open a trunk lid or other hatch, start the ignition, etc.

One or more fobs 15 may be paired with a vehicle 25. For example, as is known, a fob 15 may be programmed with a specific identification code and the vehicle 25 may include a list of identification codes authorized to send commands to the vehicle 25. The vehicle 25 may look for one or more identification codes upon receiving messages, and determine if the fob 15 is authorized.

The fob 15 computer 60 includes a processor and a memory. The processor is programmed to execute programs stored in the memory, e.g., to send commands to the vehicle 25. The transceiver 65 is configured to transmit radio frequency (RF) signals to, and optionally receive RF signals from the vehicle 25. As is known, typical fob 15 frequencies of operation for one-way communication are 315 MHz or 433 MH and for two-way communications are 902 MHz or 868 MHz. For Passive Entry and Passive Start systems, the vehicle 25 may send commands to Fob 15 using Low Frequency (LF) transmissions at frequencies of 125 kHz or 135 kHz.

The fob 15 user interface 70 includes one or more input mechanisms and may include a display. The input mechanisms may be buttons, a touch screen display, a gesture sensing device, etc., for receiving input from a user. The display may include an LCD display, LED display, buzzers speakers, haptic feedback, etc., for providing information to the user.

Additionally or alternatively, other systems may also be used to command the vehicle 25 to unlock, start, etc. For example, the vehicle 25 may be equipped with a passive entry system, e.g., that sends a message to fobs 15 proximate to the vehicle 25 and looks for a response from a paired fob 15. Other possible systems to unlock/start/etc. the vehicle 25 include a keypad, remote entry mechanical key, telematics unlock system, etc.

A portable device 20 may be, e.g., a wearable portable device 20 or a mobile portable device 20. A wearable portable device 20 may include a connectivity product such as a "smart" watch, a fitness band, smart clothing, jewelry, etc. A mobile portable device 20 may include, e.g., a mobile telephone, tablet, laptop, etc. Some wearable portable devices 20 may include built-in modems or full cellular capability. Other wearable portable devices 20 may need to link or pair, e.g., with a mobile portable device 20 such as a mobile telephone, tablet, laptop, etc. in order to establish communications with the vehicle 25. Each portable device 20 typically includes a computer 75, a transceiver 80, and an interface 85. The portable device 20 may further include one or more sensors 90, discussed further below.

Each portable device 20 may be associated with a user. For example, the portable device 20 may include a user profile 101, and send the user profile 101 to the vehicle 25 when the portable device 20 initiates communication with the vehicle 25. Alternatively, the portable device 20 may have been paired with the vehicle 25, for example, via a synchronization system in the vehicle 25. In this case, the vehicle 25 may maintain a user profile 101 associated with the paired (synchronized) portable device 20.

The user profile 101 may be a set of data associated with the user. The user profile 101 may include data such as user preferred vehicle settings (e.g., seat settings, mirror settings, temperature settings, radio station), user characteristics (e.g., height, weight, age, medical conditions), routines (typically drives to work on weekday mornings), etc. The user profile 101 may be maintained by a computer 100 on the vehicle 25. Additionally or alternatively, one or more portable devices 20 may maintain a user profile 101 identified with the user. The user profiles 101 maintained on the portable devices 20 may be accessed by the vehicle 25 and combined with the data in the vehicle 25 user profile 101. The data in the user profile 101 may be entered by the user via an interface on the vehicle 25 or one of the portable devices 20 associated with the user, determined by the computer 100 in the vehicle 25, downloaded from other computing devices, e.g., the server 30, etc.

The portable device 20 may be configured for short range wireless communication with the vehicle 25. For example, the portable device 20 transceiver 80 may be a BLUETOOTH® transceiver capable of forming links with other BLUETOOTH transceivers. One or more portable devices 20 and the vehicle 25 may accordingly exchange messages. A portable device 20 may transmit a signal including, e.g., identification data (identifying the type of user device, the identity of a user, etc.), movement data, etc. to the vehicle 25. In addition or alternatively to BLUETOOTH, other suitable wireless communication protocols, e.g., NFC, IEEE 802.11 or other protocols as may be known, may be used for communication between the portable devices 20 and the vehicle 25.

Further, a portable device 20 may be configured to link with other portable devices 20. For example, a first portable device 20 may be a smart watch, and a second portable device 20 may be a mobile telephone. The first portable device 20 may link with the second portable device 20 and exchange data with the second portable device 20; the first and second portable devices 20 may be associated with a same user. As one example, the first portable device 20 may include biometric sensors 90 to measure the heart rate of the user and transmit the heart rate to the second portable device 20. The second portable device 20 may output the heart rate data to the user via the second portable device 20 interface 85. BLUETOOTH communication links typically operate at frequencies from 2402-2480 MHz. As above, other suitable wireless communication protocols such as are known may alternatively or additionally be used to form the communication links with other portable devices 20.

In addition to biometric sensors 90, portable device 20 sensors 90 may include accelerometers, g-sensors, gyroscopes, compasses, light sensors, cameras, etc. The sensors 90 may measure movements of the portable device 20 and output movement data that the portable device 20 may then communicate to the vehicle 25. As described below, the vehicle 25 may determine, based on the movement data, e.g., that the user of the portable device 20 has opened a door of the vehicle 25.

Figure 2:
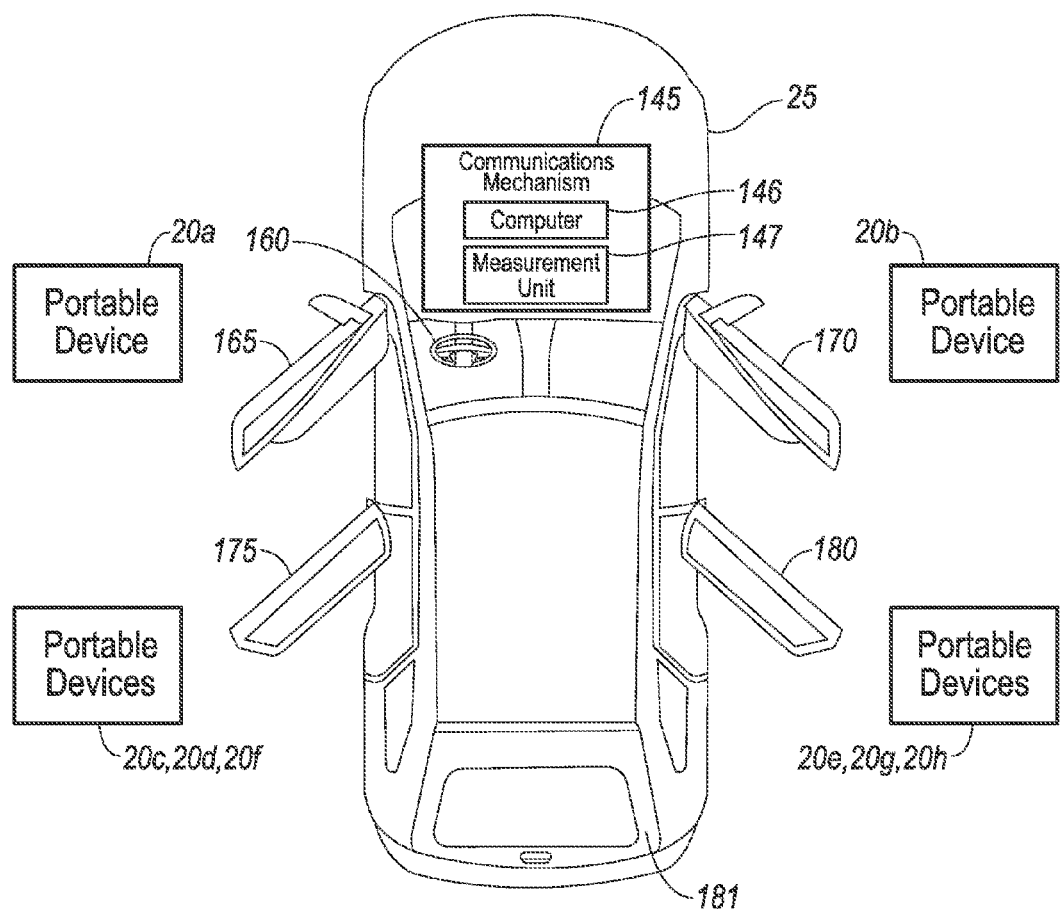
FIG. 2 is a top view of an exemplary vehicle including a communications mechanism for communicating with portable devices.

The vehicle 25 is generally a land-based vehicle having three or more wheels, e.g., a passenger car, light truck, etc. The vehicle 25 accordingly generally has a front, a rear, a left side and a right side, wherein the terms front, rear, left and right are understood from the perspective of a user of the vehicle 25 seated in a driver's seat in a standard operating position, i.e., facing a steering wheel 160 (FIG. 2). The vehicle 25 includes the computer 100 including a processor and a memory. The memory includes one or more forms of computer-readable media, and storing instructions executable by the processor for performing various operations, including as disclosed herein. Further, the computer 100 may include and/or be communicatively coupled to more than one other computer, e.g., steering sensors 115, door sensors 120, seat sensors 125, other sensors 130 and controllers 135. The vehicle 125 computer 100 is further typically communicatively coupled with a communications mechanism 145 configured for wireless communications with on-board and external wireless devices including the fob 15, portable device 20, remote server 30 and network 35.

The computer 100 is generally programmed and arranged for communications on a controller area network (CAN) bus or the like. The computing device 100 may also have a connection to an onboard diagnostics connector (OBD-II), e.g., according to the J1962 standard. Via the CAN bus, OBD-II connector port, and/or other wired or wireless mechanisms, the computer 100 may transmit messages to various devices in a vehicle and/or receive messages from the various devices, e.g., controllers, actuators, sensors, etc. In addition, the computer 100 may be configured for communicating, e.g., with one or more remote servers 30, with one or more fobs 15, with one or more portable devices 20 and/or with the network 35.

The steering sensors 115 may be steering angle sensors, steering torque sensors, motor sensors associated with power steering assist, etc., known to provide data related directly or indirectly to steering operations. For example, a steering sensor 115 may be a steering angle sensor which senses a rotation of a vehicle 25 steering wheel 160, and communicates the steering wheel 160 rotation data to the computing device 100. As another example, a steering sensor 115 may sense rotation of a motor providing power assist for steering operations, and provide the motor rotation data to the computer 100.

Door sensors 120 may be mechanical switches that are activated by the door, proximity sensors, hall-effect sensors, or the like, such as are known, that indicate if a door is open or closed and that provide door status data to the computing device 100. For example, there may be one door sensor 120 associated with each door of the vehicle 25 including a rear hatch or liftgate.

Seat sensors 125 may include a variety of sensors including occupancy sensors and seat position sensors such as are known. The seat sensors 125 may, e.g., determine whether a user is occupying a seat, determine the weight of the user, and communicate the determined weight to the computer 100. Further, the seat sensors 125 may detect either directly or indirectly the position of a seat, angle of a seat back, height of a headrest, etc., and provide data to the computer 100 with regard to one or more of these settings. Yet further, the computer 100, may, e.g., upon identifying a seat user, adjust settings to a user profile associated with the user.

The vehicle 25 may include one or more other sensors 130. The other sensors 130, may include, as non-limiting example only, cameras, optical sensors, radar, microphones, proximity sensors, ultrasonic sensors, pressure sensors, accelerometers, gyroscopes, temperatures sensors, current sensors, voltage sensors, infrared sensors, capacitive sensors, etc. The sensors may include processors and memories, and may be configured to communicate with and send data to the computer 100, e.g., via a CAN bus or the like.

The vehicle 25 may also include one or more controllers 135 for controlling vehicle 25 components. The one or more controllers 135 may include known controllers, as non-limiting examples, a seat controller, a power steering controller, a door lock controller, a door latch controller, a climate controller, a mirror adjustment controller, a seatbelt controller, a climate controller, a brake controller, etc. Each of the controllers 135 may include respective processors and memories, one or more actuators, and one or more sensors, as is known. The controllers 135 may be configured to receive instructions from the computing device 100 and control an actuator based on such instructions. For example, a door lock controller 135 may receive an instruction to unlock a door and may cause an actuator to unlock the latch lock motor associated with the door. Further, the controller 135 may include sensors. The sensors, may, e.g., detect the action of the actuator. For example, the door lock controller 135 may detect the lock being in an unlocked condition. The controller 135 may provide data regarding the status of the lock to the computer 100.

As stated above, a vehicle 25 may further include a communications mechanism 145 for wireless communications with vehicle on-board and external devices configured for wireless communications. For example, the communications mechanism 145 may include a computer 146 having a processor and a memory, and a measurement unit 147. The communications may be direct communications, i.e., between a transceiver in the communications mechanism 145 and a transceiver in the wireless device, or indirect communications, e.g., via a network such as a network 35.

The communications block 145 may generally be configured to support communications with 1-Way (typically 315 MHz or 433 MHz), or 2-Way (typically 902 MHz or 868 MHz) remote keyless entry (RKE) systems, passive-entry passive-start (PEPS) systems (125 kHz LF challenge and 315 MHz or 433 MHz response), near field communications (NFC) (typically 13.56 MHz), Bluetooth systems (2402-2408 MHz), vehicle-to-vehicle (V2V) systems and vehicle-to-infrastructure (V2I) systems in the Dedicated Short Range Communications (DSRC) Band (5.9 GHz), portable devices in the cellular bands, Wi-Fi (typically 2.4 GHz or 5 GHz bands), GPS systems (1575.42 MHz and 1227.6 MHz), etc. Examples of protocols that the communication block 145 may support include Bluetooth, NFC, DSRC, 3G UMTS protocols as defined by the 3GPP standards body, 4G LTE protocols as defined by the 3GPP standards body, Wi-Fi 802.11 protocols as defined by IEEE, W-Max 802.16 protocols as defined by IEEE, or other suitable wireless communication protocols.

As described in more detail below, the communications mechanism 145 may be configured to communicate with the fob 15, the portable device 20 and, via the network 35, with a remote server 30.

The communications mechanism 145 may be configured to establish communications with one or more portable devices 20. Upon receiving an instruction to unlock the vehicle 25 as described above, the computer 100 may instruct the communications mechanism 145 to search for and establish communications with portable devices 20 proximate to, e.g., within 3 meters of, the vehicle 25. The communications mechanism 145 may search for all portable devices 20 proximate to the vehicle, or, e.g., a specific list of portable devices 20 associated with known users of the vehicle 25. The portable devices 20 may then respond to the communications mechanism 145. In another scenario, the communications mechanism 145 may, e.g., periodically search for, and establish communications with, portable devices 20 proximate the vehicle 25. Upon establishing communications with the devices 20, the communications block 145 may send instructions requesting user identification data, movement data, etc. from the portable devices 20. In certain scenarios, the computer 100 may specifically establish communications directly or indirectly with wearable portable devices 20.

In addition to communicating with the one or more portable devices 20, the communications mechanism 145 may determine a strength of signals received from respective portable devices 20. As shown in FIG. 1, the communications mechanism 145 may include a measurement unit 147. The measurement unit 147 may receive signals from the portable devices 20, and measure signal strength in a known manner. When applicable, e.g., when seeking to determine a location of a user, the measurement unit 147 should measure the signal strength of the signal transmitted from the wearable portable device 20 and not the signal transmitted from the supporting mobile portable device 20. The measurement unit 147 may provide this information to the computer 100.

As described below, the strength of a signal received from a portable device 20 may be an indication of the distance (also referred to herein as range) of the portable device 20 from the communications mechanism 145. This information may be used, particularly in the case of a wearable portable device 20, to determine a boundary or zone where a user of the wearable portable device 20, is located within the vehicle 25. The measurement unit 147 may determine these zones with one transceiver antenna. Alternatively, two or more antennas may be used if, e.g., they exist for other features.

The vehicle 25 communications mechanism 145 may further be configured to communicate, e.g., over a network 35 with a remote server 30. For example, when the vehicle 25 has been involved in an incident, the vehicle 25 may be able to transmit a message to the remote server 30 indicating that the vehicle 25 was involved in an incident, and may be able to send additional information such as the location of the vehicle 25. When the vehicle 25 is linked to one or more portable devices 20, the vehicle 25, via the communications mechanism 145 may additionally or alternatively be able to send user status information, such as the user's vital signs, to the remote server 30.

The network 35 represents one or more mechanisms by which the vehicle 25 may communicate with remote computing devices, and may be one or more of various wired or wireless communication mechanisms, including any desired combination of wired (e.g., cable and fiber) and/or wireless (e.g., cellular, wireless, satellite, microwave and radio frequency) communication mechanisms and any desired network topology (or topologies when multiple communication mechanisms are utilized). Exemplary communication networks include wireless communication networks, local area networks (LAN) and/or wide area networks (WAN), including the Internet, providing data communication services.

Processes

Identifying a Vehicle Unlock or Other Trigger Event for a User Location Identification Process The vehicle 25 computer 100 may receive a signal from the fob 15 to unlock the vehicle 25, or recognize another trigger event for starting a user location identification process. For example, a user of the vehicle 25 may activate the fob 15, and the fob 15 may send an unlock command to the vehicle 25. The vehicle 25 computer 100 may receive the unlock signal, and initiate a process to identify locations of one or more users in the vehicle 25.

As another example, a sensor 130 may detect a user grabbing or touching a door handle to pull on the door handle with the intent to open the door, and based on the detection, the computer 100 may initiate and establish communications with fobs 15 proximate the vehicle 25 to authorize unlocking a door. The computer 100 may determine that one or more of the fobs 15 is an authorized fob 15 for the vehicle 25, e.g., in a manner as described above. Conversely, if the door was already unlocked the trigger of sensor 130 may still be used to inform computer 100 that a user is about to open a door. The computer 100 may also receive an input from a key pad on the vehicle 25, a door or global unlock event activated by a mechanical key, an ignition activated by a mechanical key, from a telematics system, etc. that is identified as a trigger event for initiating a user location identification process. Still further, the computer 100 could initiate the user location identification process periodically, based on a timer, etc.

Associating Portable Devices with Users

The computer 100 is generally programmed to initiate a process to communicate with one or more portable devices 20 proximate to the vehicle 25. For example, the computer 100 may be triggered to initiate communications as described above. The computer 100 may send commands to portable devices 20 that were paired, e.g., by the owner with the vehicle 25 requesting that the portable devices 20 respond and provide identification. The computer 100 may further listen for other, not previously paired portable devices 20 that are proximate to the vehicle 25. Further, the computer 100 may listen for messages between portable devices 20. Based on data collected from the messages, e.g., each portable device 20 may transmit an identifier or the like, the computer 100 may identify a portable device 20 or a group of portable devices 20 associated with a user, and may further associate the user and group of portable devices 20 with a user profile 101, e.g., maintained by the computer 100. The computer 100 then can wait for a predetermined time period, e.g., 10 seconds, following the transmission of the commands to the portable devices 20, and proceed to identify one or more groups of portable devices 20, and to associate the portable devices 20 and/or groups of portable devices 20 with users.

Identifying Door Opening Events from Wearable Device Movements

Upon recognizing a trigger event, the computer 100 may initiate a process to instruct the portable device 20, which may be a wearable portable device 20, to record g-sensor data for a specified period to identify hand motions and then monitor all vehicle 25 door sensors 120 to determine where users entered the vehicle 25. The computer 100 may monitor g-sensor movements of the portable devices 20 associated with vehicle 25 users, and based on the movement data identify a device 20, and hence a user, that may be associated with opening a particular vehicle 25 door. In the case of only one door opening and only one portable device 20 being identified with a signature movement data pattern, it may be possible to conclude who has entered that door. In cases where more doors have opened than there are detected portable devices 20, additional data is required to predict the user's location. The computer 100 may further use the movement data as an indication of where the user is located in the vehicle 25 after entering the vehicle 25.

Now referring to FIG. 2, the vehicle 25 may include a steering wheel 160, front left door 165, front right door 170, rear left door 175, rear right door 180, and rear hatch door 181. The vehicle 25 may further include the communications mechanism 145. The communications mechanism 145 may be located in a front center portion of the vehicle 25. Alternatively, for example, a portion of the communication mechanism 145 used to establish communication with the portable devices 20 may be located in the center front portion of the vehicle 25, and other portions of the communications mechanism 145 may be located in one or more other locations in the vehicle 25. The portion of the communications mechanism 145 used to establish communications with the portable devices 20 should be strategically placed such that the strength of a signal received from a respective portable device 20 is indicative of a definable zone within the vehicle 25.

As described above, the communications mechanism 145 may include a measurement unit 147, and may be configured to establish communications with portable devices 20. The measurement unit 147 may be configured to measure the strength of signals received from the portable devices 20, and to report the strength of the signals from the respective portable devices 20 to the computer 100 of the vehicle 25.

Upon identifying a trigger event for initiating a user location identification process as described above, the computer 100, based on the trigger event may activate the communications mechanism 145, and instruct the communications mechanism 145 to search for and establish communications with portable devices 20 proximate the vehicle 25. The computer 100 may limit the search to previously paired portable devices 20. As above, when applicable, e.g., when seeking to identify a range of a user from the communications mechanism 145, the measurement unit 147 should measure the signal strength of the signal transmitted from the wearable portable device 20 and not the signal transmitted from the supporting mobile portable device 20.

As shown in FIG. 2, in one example, the computer 100 may find and establish communications (via the communications mechanism 145) with portable devices 20a-20h which are determined to be wearable portable devices 20. The computer 100 may command each of the wearable portable devices 20a-20h to send movement data associated with the respective wearable portable devices 20a-20h to the computer 100.

By monitoring and evaluating the movement data received from the wearable portable devices 20a-20h, the computer 100 may determine, e.g., that the user of wearable portable device 20a has opened a left side door 165, 175. Particular wrist movements, e.g., one or more of twisting counter-clockwise to grab a door handle, swinging up and to the left to open a door handle, swinging to the left on an arc similar to the arc of a door handle on a left handed door being opened, may be indicative of opening a left side door 165, 175 of the vehicle 25.

In a similar manner, the computing device 100 may determine, e.g., that a user of wearable portable device 20d also opened a left side door 165, 175, and further, in a similar manner, by identifying gestures associated with a right side door, that e.g., the user of wearable portable device 20e has opened a right side door 170, 180.

In addition to identifying movements of a wearable portable device 20 worn by a user on an arm used for opening a door, other types of movements may be identified as movements indicating a door opening. For example, for a user opening a right door 170, 180 with their right arm, and wearing a wearable portable device 20 on their left arm, particular movements, for example the swinging of the left arm around the body during door opening (or entering the vehicle 25) may be indicative of a right door 170, 180 opening event. Other movements of wearable devices 20 may be determined to be characteristic of opening a vehicle 25 door, 165, 170, 175, 180,181. Further, movements that are characteristic of closing a vehicle 25 door 165, 170, 175, 180 may indicate a user having entered a left door or a right door.

As described above, a determination that a user has opened a particular vehicle 25 door 165, 170, 175, 180, 181 may be performed by the computer 100. Additionally or alternatively, the determination may be made, e.g., by the computer 75 in the respective wearable portable device 20, and the results communicated to the computer 100. Additionally or alternatively, the determination may be made by another computer communicatively coupled to the computer 100.

Identifying Location Zones for Wearable Devices Based on Received Signal Strength Additional information regarding the location of users within a vehicle 25 may be determined based on a received signal strength of signals received by the communications mechanism 145 from portable devices 20. When applicable, e.g., when seeking to determine a range of a user from the communications mechanism 145, the portable devices 20 may be wearable portable devices 20.

Figure 3:
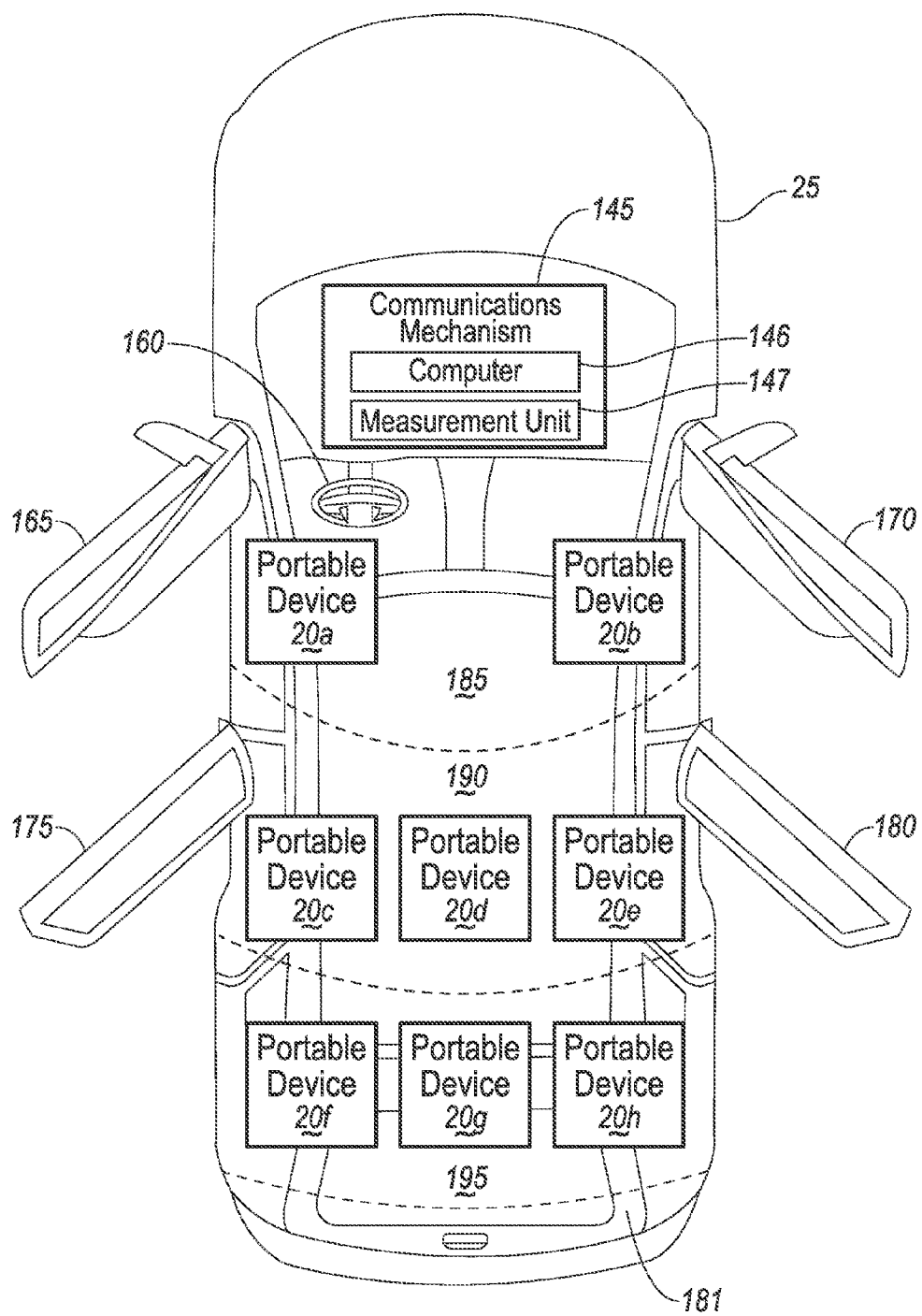
FIG. 3 is a further top view of the exemplary vehicle of FIG. 2, including the communications mechanism, illustrating location zones.

As shown in FIG. 3, the vehicle 25 may be divided into three or more zones based on distance from the communications mechanism 145; a first zone 185, a second zone 190 and a third zone 195. The zones 185, 190, 195 may, e.g., be radially shaped around a receiver portion, e.g., an antenna, in the communications mechanism 145. As another example, the receiver portion in the communications mechanism 145 may be directional, i.e., have a reception sensitivity that is greater in some directions than others, and the zones 185, 190, 195 may be defined by the directionality of the receiver portion.

Further, the zones 185, 190, 195 may extend beyond the vehicle 25 and/or the communications mechanism 145 may receive signals from outside of the defined zones, 185, 190, 195. For example, the communications mechanism 145 may be able to receive a signal from the portable device 20 that is beyond the third zone 195. Further, the zones 185, 190, 195 may form a set of concentric circles around the receive portion, and include areas outside of the vehicle 25. The communications mechanism 145 may determine, based on the RSSI of the portable device 20, that a portable device 20 is within range to communicate with the communications mechanism 145, but outside of the third zone 195.

The portable devices 20a and 20b may be located in the first zone 185. The portable devices 20c, 20d, 20e may be located in the second zone 190, and the portable devices 20f, 20g, 20h may be located in the third zone 195. As above, each of the portable devices 20a-20h may be a wearable portable device 20. Also as above, the computing device 100 may establish communications via the communications mechanism 145 with each of the portable devices 20a-20h.

The communications mechanism 145 may be configured to measure received signal strength of the signals received from each of the portable devices 20a-20h, and provide a received signal strength indication (RSSI) such as is known to the computer 100 respectively for each of the portable devices 20a-20h.

Based on the respective received signal strengths, the computer 100 may determine the zone in which each of the portable devices 20a-20h is located. For example, if the RSSI is greater than or equal to a first predetermined threshold and less than a second predetermined threshold, the computing device may determine that the associated portable device 20 is located within the third zone 195. If the RSSI is greater than or equal to the second predetermined threshold and less than a third predetermined threshold, the computer 100 may determine that associated portable device 20 is located in the second zone 190. If the RSSI is greater than or equal to the third predetermined threshold, the computer 100 may determine that the associated portable device 20 is located in the first zone 185. The first, second and third predetermined thresholds may be determined empirically based on representative portable devices 20, the location of the communications mechanism 145, the type of vehicle 25, etc. In the example according to FIG. 3, the computer 100 would determine that portable device 20a-20b are in the first zone 185, devices 20c-20e are in the second zone 190 and devices 20f-20h are in the third zone 195.

Identifying the Driver and Front Seat Passenger Based on Door Opening and Zone Data Based on the door opening data and zone data collected above, the computer 100 can be programmed to determine the driver and front passenger of the vehicle 25.

For example, if, as described above, the computer 100 determines based on the RSSI of the portable device 20a that the portable device 20 is in the first zone 185, and determines based on the movement data from the portable device 20a that the user of portable device 20*a* entered a left side door of the vehicle 25, the computer 100 may further determine that the user of the portable device 20*a* is located in a front left (driver's) seat of the vehicle 25.

Further, if, in the example above, the computer 100 determines based on the RSSI of portable device 20*b* that the portable device 20*b* is also in the first zone 185, the computer 100 may determine that the user of the portable device 20*b* is in a front passenger seat. The same process for locating the driver and front row passenger can also be applied to right hand drive vehicles by reversing the relationships of detected door opening events.

Identifying Relative Locations of Vehicle Users Based on Acceleration Data During a Turning Event During a turning event, i.e., when the vehicle 25 is turning, the portable devices 20 in the vehicle 25 will generally experience acceleration. The acceleration experienced by each portable device 20 will depend on a location of the portable device 20 in the vehicle 25. As described below, the computer 100 may receive movement data respectively from each of the portable devices 20, and may determine a relative location of the portable devices 20, e.g., of a first portable device 20 to a second portable device 20, based on the movement data. Generally, during the turning event, portable devices 20 located on a side of the vehicle 25 corresponding to the turn direction, e.g., on a left side of the vehicle during a left turn, will travel at a lower velocity and experience a lower acceleration than a portable device 20 located on a side of the vehicle 25 opposite the turn direction. When applicable, e.g., when seeking to determine a location of a first user relative to a second user based on acceleration data during the turning event, the portable devices 20 may be wearable portable devices 20.

Figure 4:
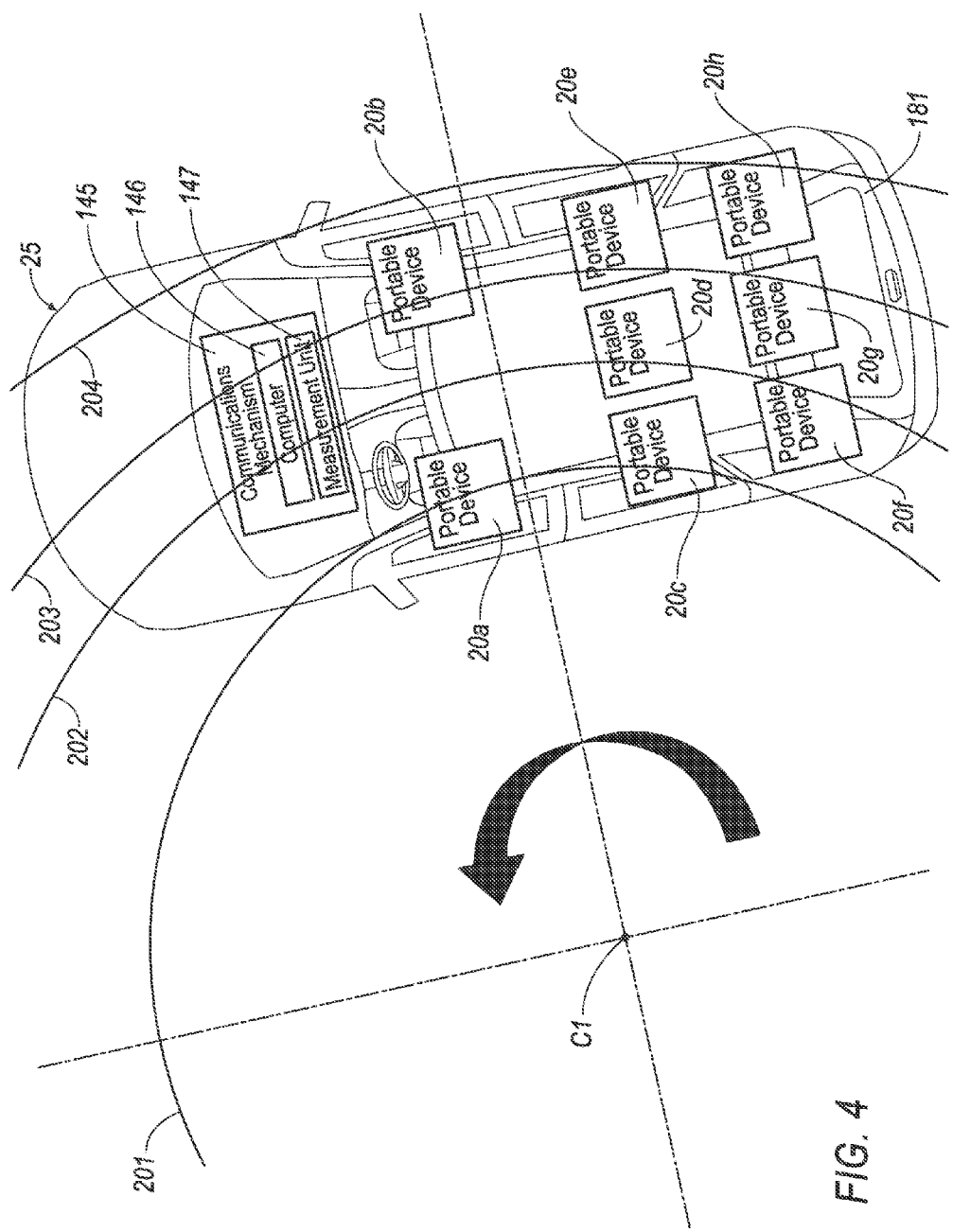
FIG. 4 is a further top view of the exemplary vehicle of FIG. 2, illustrating a turning event.

As an example, referring to FIG. 4, the vehicle 25 may be turning to the left. Portable devices 20*a*-20*h* may each be in a different location in the vehicle 25 as shown. Due to the different locations, each of the portable devices 20*a*-20*h* will travel along a different path during the turning event and, hence, therefore generally experience an acceleration different than the acceleration(s) experienced by other devices 20. In this example, the portable devices 20*a* and 20*c* travel approximately along a first path 201 and experience a first acceleration $a_1$. Portable devices 20*d* and 20*f* travels approximately along a second path 202 and experiences approximately a second acceleration $a_2$. The portable devices 20*b*, 20*e* and 20*g* travels approximately along a third path 203 and experiences approximately a third acceleration $a_3$. The portable device 20*h* travels approximately along a fourth path 204 and experiences a fourth acceleration $a_4$. According to the example above, $a_4 > a_3 > a_2 > a_1$. For example, the greater acceleration $a_3$ experienced by portable device 20*e* relative to the acceleration $a_2$ experienced by portable device 20*d* indicates that the portable device 20*e* is located radially outward from portable device 20*d*. Further, the computer 100 may also use acceleration data obtained from vehicle sensors (e.g., crash sensor) as an additional reference point. For example, the vehicle sensor is in a known position so the acceleration values from the portable devices 20 can also be referenced to acceleration readings from the vehicle sensor to gain further data on location.

Still following the example of FIG. 4, the computer 100 may determine, based on data from the vehicle sensors and controllers 115, 120, 125, 130, 135, that a turning event is in-progress. For example, a turning event may be defined as the vehicle turning at an angle greater than ten degrees (10°) for a time period greater than one second.

After determining that a turning event is in progress, the computer 100 may send a request to the portable devices 20*a*-20*h* for movement data from each of the portable devices 20*a*-20*h* during the turning event. The computer 100 may define a time period, e.g., specify a start time and a duration for which the computer 100 requests movement data. The portable devices 20*a*-20*h* may, upon receiving the request, send data representing the movement of the respective portable device 20*a*-20*h* during the time period.

Based upon the received movement data, the computer 100 may determine accelerations experienced respectively by each of the portable devices 20*a*-20*h*. As one example, the computer 100 may select a particular time within the time period, and determine an acceleration of each of the portable devices 20*a*-20*h* at the time period. Additionally or alternatively, the computer 100 may determine an average acceleration experienced respectively by each of the portable devices 20*a*-20*h* during the time period. As another alternative, the computer 100 may determine a peak acceleration experienced respectively by each of the portable devices 20*a*-20*h* during the time period.

Following determination of the acceleration respectively for each of the portable devices 20*a*-20*h*, the computer 100 may determine the relative location of portable devices 20*a*-20*h*, one to the other.

For example, still following the example above, the acceleration of portable devices 20*d* and 20*f* will be approximately $a_2$, while the acceleration of the portable devices 20*a* and 20*c* will be approximately $a_1$. Based on these acceleration values, the computer 100 may determine that the portable devices 20*d*, 20*f* are located radially outward from the portable devices 20*a*, 20*c*, as measured from a center c1 of the turn. Similarly, portable devices 20*b*, 20*e*, 20*g* with an acceleration of approximately $a_3$ may be determined to be radially outward from portable devices 20*d*, 20*f*, and portable device 20*h* may be determined to be radially outward from portable devices 20*b*, 20*e*, 20*g*.

Using Acceleration Data to Confirm/Determine User Seat Location

As described above, the vehicle 25 computer 100 may determine under some circumstances, based on door opening data and signal strength data from portable devices 20*a*-20*h*, the occupants of the driver seat and the front passenger seat. The computer 100 may further determine, based on the received signal strength indication of each of the respective portable devices 20, a zone, e.g., the first, second and third zones 185, 190, 195 of FIG. 3, where the user of each of the respective portable device 20*a*-20*h* is located. However, users of the vehicle 25 may change seats without exiting the vehicle 25. Further, zone data representing the zone in which a user is located is generally not sufficient to determine in which seat a user is located. Accordingly, acceleration data can advantageously be used to confirm and/or supplement such signal strength data.

For example, locations of users of the vehicle 25 may be confirmed or determined with additional precision, by, e.g., combining zone data based on portable device 20 signal strengths, with relative position data based on accelerations of the portable devices 20 during a turning event.

Still following the example of FIG. 4, based on received signal strength indications, the computer 100 may determine that portable devices 20*a* and 20*b* are located in the first zone 185. Based on comparisons of the acceleration of portable devices 20*a*, 20*b* during a turning event, the computer 100 may determine, e.g., that the portable device 20*a* is radially inward from portable device 20*b* during a left hand turn. By combining the zone data and relative position data, the computer 100 may determine that the user associated with portable device 20a is in the driver seat and the user associated with portable device 20b is in the front passenger seat.

Similarly, for the second zone 190, the computer 100 may determine based on the received signal strength indications that the portable devices 20c, 20d, and 20e are located in the second zone 190. Based on comparisons of the acceleration of the portable devices 20c, 20d, 20e during the turning event, the computer 100 may determine that the user of portable device 20c is on the left of the user of portable device 20d and further that the user of portable device 20d is on the left of the user of portable device 20e. Using a similar approach, the location of the respective users of portable devices 20f, 20g, 20h in the third zone 195 may be determined.

Process for Determining User Location(s)

Figure 5:
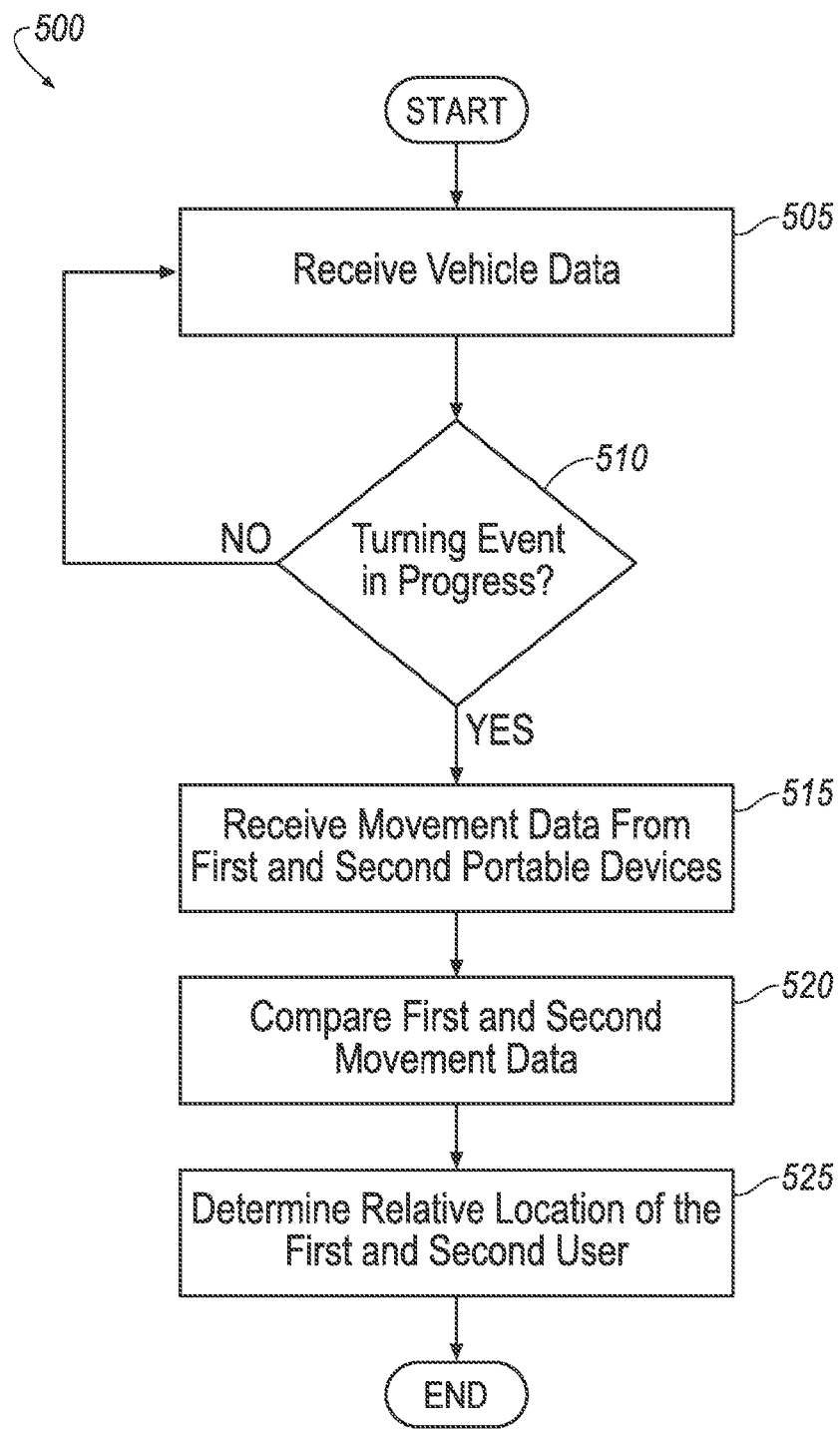
FIG. 5 is a diagram of an exemplary process for determining the relative locations of a first and second vehicle user during the turning event.

FIG. 5 is a diagram of an exemplary process 500 for determining the relative locations of two or more users within the vehicle 25 based on data from portable devices 20 associated with vehicle 25 users. The process 500 starts in a block 505.

In the block 505, the computer 100 receives vehicle 25 data from the vehicle 25 sensors and controllers 115, 120, 125, 130, 135, etc. The vehicle data may include, e.g., vehicle 25 velocity, vehicle 25 steering angle, vehicle 25 acceleration, vehicle 25 wheel angular displacement, etc. Upon receiving the vehicle 25 data, the process 500 continues in the block 510.

In the block 510, the computer 100 determines if a turning event is in progress. For example, a turning event could be defined as the vehicle turning at an angle greater than or equal to ten (10°) for a predetermined time period, e.g. one second. Additionally, the computer 100 may define a turning event to include turns that occur at a velocity greater than a predetermined, speed, e.g., 20 mph. The computer 100 may further determine a time period corresponding to the turning event. The time period may be, for example, defined as three seconds following an identified start time. The time period may be used, as described below, to define a time period during which movement data from the wearable devices 20 should be measured. If the computer 100 determines, based on the vehicle 25 data, that a turning event is not in progress, the process 500 continues in the block 505. If the computer 100 determines that a turning event is in progress, the process 500 continues in a block 515.

In the block 515, the computer 100 receives movement data from first and second portable devices 20a, 20b. For example, the computer 100, upon identifying that a turning event is in progress, may send a request to the first and second portable devices 20a, 20b for movement data representing the movement of the respective first and second portable devices 20a, 20b during the time period. The first and second portable devices 20a, 20b may each transmit respective movement data to the computer 100. The process 500 continues in a block 520.

In the block 520, the computer 100 compares the movement data from the first portable device 20a with the movement data from the second portable device 20b. For example, the computer 100 may, as described above, determine an acceleration for each of the respective first and second portable devices 20a, 20b and compare the respective accelerations. The process 500 continues in a block 525.

In the block 525, the computer may determine the location of a first user associated with the first portable device 20a, relative to a second user associated with the second portable device 20b. Generally, as described above, the portable device 20 that experiences greater acceleration, and its associated user, will be located radially outward from the portable device 20 that experiences less acceleration and its associated user. For example, based on the comparison performed in the block 520, the computer 100 may determine that the acceleration of the second portable device 20b during the time period was greater than the acceleration of the first portable device 20a. Based on the higher acceleration value during the time period for the second portable device 20b, the computer 100 may determine, as described above, that the second portable device 20b is located radially outward from the first portable device 20a during the turning event. In the event, for example, that the computer 100 knows that the each of the first and second portable devices 20a, 20b are located in a first zone 185 of the vehicle 25, the computer 100 may further determine that the user of the first portable device 20a is in the driver seat and the user of the second portable device 20b is in the passenger seat. Upon providing the best available determination of the first and second users' location, the process 500 ends.

In order to minimize the use of battery power from the portable device 20, the computer 100 or vehicle 25 may decide to only request portable device 20 data under certain condition such as time since last request, speed, or other criteria. It is not necessary to perform the procedure of FIG. 5 on every turn.

CONCLUSION

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A computer comprising: a memory and a processor storing instructions executable by the processor such that the computer is programmed to:
   receive, from a first wearable portable device associated with a first user, first movement data representing movement of the first wearable portable device during a first time period;
   receive, from a second wearable portable device associated with a second user, second movement data representing movement of the second wearable device during the first time period;
   compare the first movement data with the second movement data; and
   determine a location in the vehicle of the first user relative to the second user based at least in part on the comparison.

2. The computer of claim 1, further programmed to:
   receive data representing movement of the vehicle, wherein the vehicle movement data indicates that the vehicle is turning in a first direction during the first time period.

3. The computer of claim 2, further programmed to:
   determine, based on the comparison, that a first acceleration of the first wearable portable device during the first time period is greater than a second acceleration of the second wearable portable device during the first time period.

4. The computer of claim 3, further programmed to:
   determine, based on the determination that the first acceleration is greater than the second acceleration during the first time period, that the first user is located radially outward from second user.

5. The computer of claim 2, further programmed to:
   determine, based on the vehicle movement data, a time period during which the vehicle is turning; and
   setting the first time period to include the turning time period.

6. The computer of claim 5, further programmed to:
   send, based upon the setting of the first time period, a request to one or more wearable portable devices for movement data relating to the first time period.

7. The computer of claim 1, wherein the processor is further programmed to:
   determine that the first and second users are in a first row of vehicle seats; and
   determine, based at least in part on the comparison of the first and second movement data, that one of the first and second users is in the driver seat and another of the first and second users is in the passenger seat.

8. The computer of claim 7, wherein the determination that the first and second users are in the front row of vehicle seats is based at least in part on first and second received signal strengths from the respective first and second wearable portable devices.

9. The computer of claim 7, further programmed to:
   receive, from a third wearable portable device associated with a third user, third movement data representing movement of the third wearable portable device during the first time period;
   receive, from a fourth wearable portable device associated with a fourth user, a fourth movement data representing movement of the fourth wearable portable device during the first time period;
   determine that the third and fourth users are located in a second row of vehicle seats;
   compare the respective third and fourth sets of movement data; and
   determine a location in the vehicle of the third user relative to the fourth user in the second row based at least in part on the comparison of the third and fourth sets of movement data.

10. The computer of claim 9, wherein the determination that the third and fourth users are in the second row of vehicle seats is based at least in part third and fourth received signal strengths from the respective third and fourth wearable portable devices.

11. A method comprising:
    receiving, from a first wearable portable device associated with a first user, first movement data representing movement of the first wearable portable device during a first time period;
    receiving, from a second wearable portable device associated with a second user, second movement data representing movement of the second wearable device during the first time period;
    comparing the first movement data with the second movement data; and
    determining a location in the vehicle of the first user relative to the second user based at least in part on the comparison.

12. The method of claim 11, further comprising:
    receiving data representing movement of the vehicle, wherein the vehicle movement data indicates that the vehicle is turning in a first direction during the first time period.

13. The method of claim 12, further comprising:
    determining, based on the comparison, that a first acceleration of the first wearable portable device during the first time period is greater than a second acceleration of the second wearable device during the first time period.

14. The method of claim 13, further comprising:
determining, based on the determination that the first acceleration is greater than the second acceleration during the first time period, that the first user is located radially outward from second user.

15. The method of claim 12, further comprising:
determining, based on the vehicle movement data a time period during which the vehicle is turning; and
setting the first time period to include the turning time period.

16. The method of claim 15, further comprising:
sending, based upon the setting of the first time period, a request to one or more wearable portable devices requesting movement data relating to the first time period.

17. The method of claim 11, further comprising:
determining that the first and second users are in a first row of vehicle seats; and
determining, based at least in part on the comparison of the first and second movement data, which of the first and second user is in the driver seat and which of the first and second user is in the passenger seat.

18. The method of claim 17, wherein the determination that the first and second users are in the front row of vehicle seats is based at least in part on first and second received signal strengths from the respective first and second wearable portable devices.

19. The method of claim 17, further comprising:
receiving, from a third wearable portable device associated with a third user, a third movement data representing movement of the third wearable portable device during the first time period;
receiving, from a fourth wearable portable device associated with a fourth user, a fourth movement data representing movement of the fourth wearable portable device during the first time period;
determining that the third and fourth users are located in a second row of vehicle seats;
comparing the respective third and fourth movement data; and
determining a location in the vehicle of the third user relative to the fourth user based at least in part on the comparison.

20. The method of claim 19, wherein the determination that the third and fourth users are in the second row of vehicle seats is based at least in part on third and fourth received signal strengths from the respective third and fourth wearable portable devices.

* * * * *